Aug. 4, 1970 G. OROSCHAKOFF 3,522,685
MESH REINFORCEMENT FOR REINFORCED CONCRETE STRUCTURES
Original Filed Nov. 1, 1967 5 Sheets-Sheet 1

INVENTOR.
Georgi OROSCHAKOFF
BY Karl F. Ross
Attorney

Aug. 4, 1970  G. OROSCHAKOFF  3,522,685
MESH REINFORCEMENT FOR REINFORCED CONCRETE STRUCTURES
Original Filed Nov. 1, 1967  5 Sheets-Sheet 4

INVENTOR.
Georgi OROSCHAKOFF
BY Karl G. Ross
Attorney

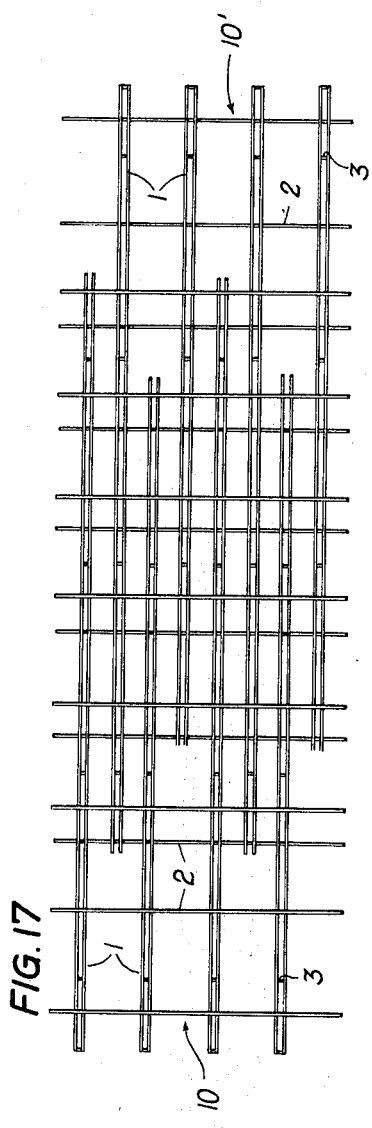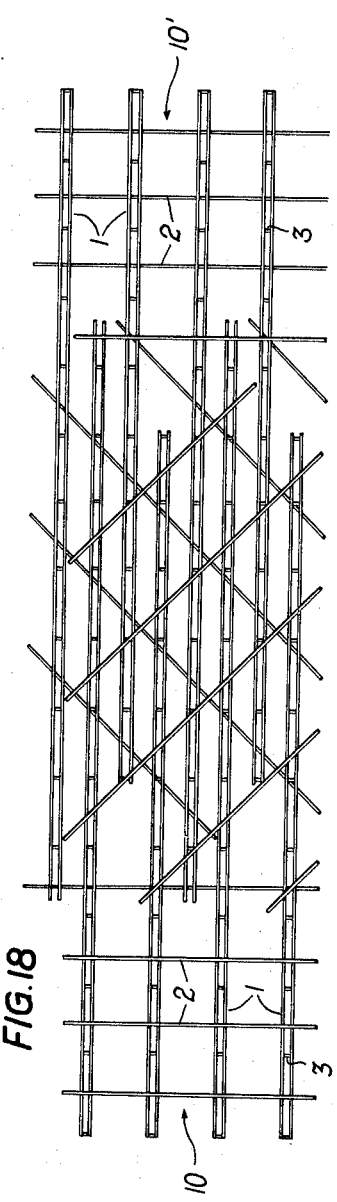

United States Patent Office 3,522,685
Patented Aug. 4, 1970

3,522,685
MESH REINFORCEMENT FOR REINFORCED CONCRETE STRUCTURES
Georgi Oroschakoff, Simon-Denk-Gasse 7, Vienna 9, Austria
Continuation of application Ser. No. 679,854, Nov. 1, 1967. This application Aug. 11, 1969, Ser. No. 850,334
Claims priority, application Austria, Apr. 6, 1967, A 3,290/67
Int. Cl. E04b 2/20; E04c 2/42
U.S. Cl. 52—432                     6 Claims

ABSTRACT OF THE DISCLOSURE

A plurality of laterally spaced, transverse distributors are provided, which extend at least in part in a common plane. A plurality of laterally spaced, double longitudinal bars are provided, each of which consists of two individual longitudinal bars, which are laterally spaced and individually connected to said transverse distributors, and additional connecting means interconnecting the two individual longitudinal bars of each double longitudinal bar.

---

Figure 1:
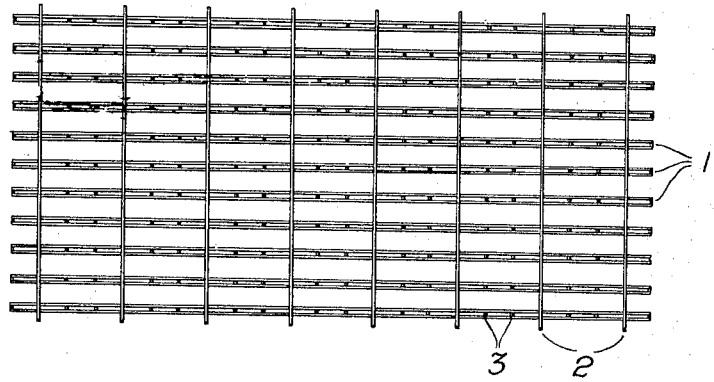

This application is a continuation of Ser. No. 679,854, filed Nov. 1, 1967, now abandoned.

This invention relates to a mesh reinforcement for reinforced-concrete structures, the reinforcement consisting of longitudinal bars interconnected by transverse distributors.

In recent years, structural steel mesh has been increasingly used instead of round steel bars as a reinforcement in reinforced-concrete slabs and the like. The structural steel mesh is preferred because it involves a reduced expenditure of work, although it has some disadvantages. These disadvantages include, inter alia, an increased expenditure of steel, the formation of joints which must be overlapped, and the difficulties which are involved in the connections between slabs, beams, grillages or the like.

These connections are usually established with the aid of inserts of round bar steel disposed adjacent to the joints or by cutting through the end distributor of a fabric so that a sufficiently large bond length for the main reinforcing rods is obtained.

In addition to the difficulties involved in the joints of conventional reinforced-concrete structures, difficulties are involved in the manufacture of prefabricated parts of reinforced concrete, which are used on an increasing scale. In almost all such system the connections are established by connecting loops, which consist of round steel bars. At the joint between two prefabricated floor slabs over a load-carrying wall panel, a connection must be established by overlapping loops of round bar steel, which are embedded in the floor slabs. The embedding of these connecting loops is expensive, and a large amount of steel is required to provide the required bond length in the prefabricated parts and in the grouted joint. Besides, a large wall thickness is required in such cases.

In other known systems, the connections between the reinforced floor slabs and between said slabs and other elements of reinforced or precast concrete are established by inserting and grouting round steel bars in suitable recesses when the elements have been assembled.

A mesh reinforcement is known in which the longitudinal bars consist in its intermediate portion of double bars forming pairs of closely spaced bars separated by larger distances between the pairs. In this known mesh reinforcement, the double bars are connected only by the transverse distributors so that the above-mentioned disadvantages are also encountered.

According to the invention, these disadvantages are eliminated in that the longitudinal bars are arrayed in pairs of juxtaposed bars lying parallel to the plane of the transverse distributors or at right angles to said plane, and the bars of each pair are interconnected by the transverse distributors and additional means, at least at their ends. In a preferred embodiment, the double bars consist of Bistahl (ladderlike) bars or are connected like Bistahl bars in any desired manner by cross-webs.

The end portions of the mesh reinforcement may easily be connected by the cross-webs of the double bars while the required bond length is maintained.

Figure 6:
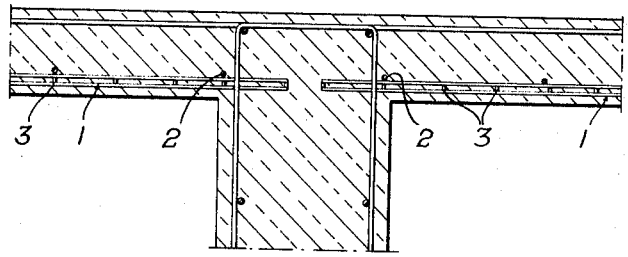
Figure 7:
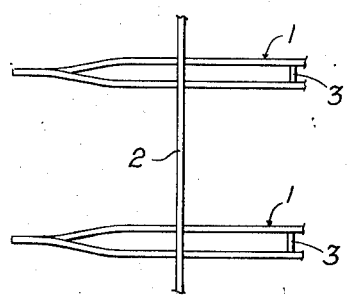
Figure 8:
Figure 9:
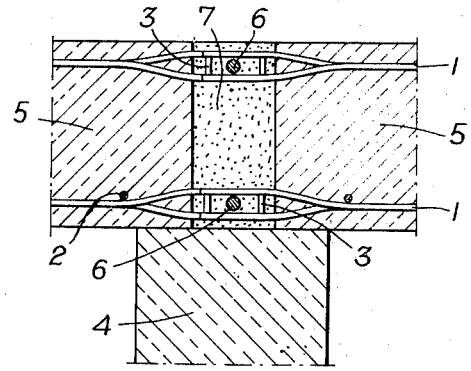
Figure 10:
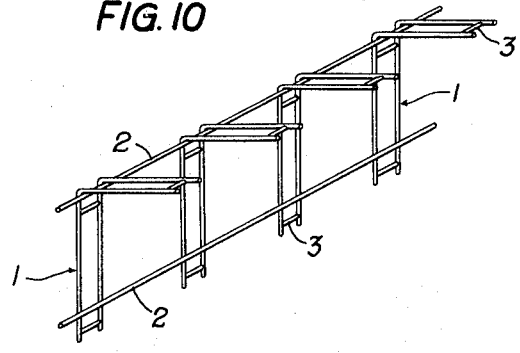
Figure 14:
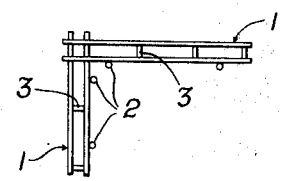
Figure 11:
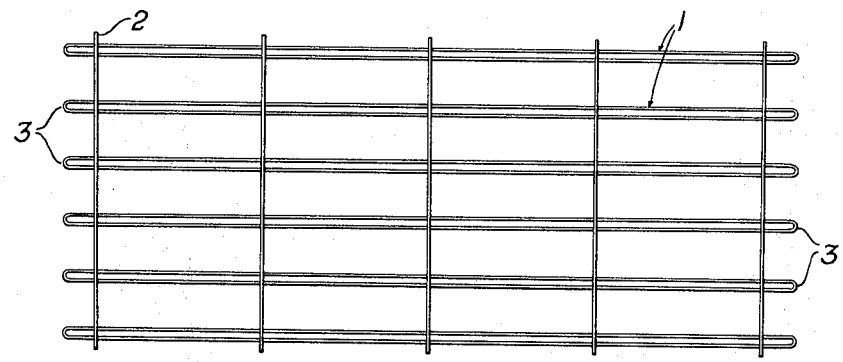
Figure 12:
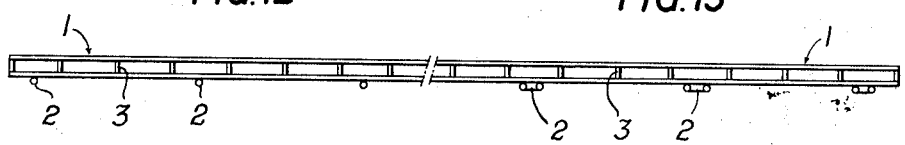
Figure 13:
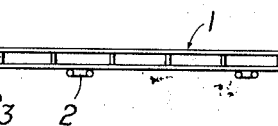
Figure 15:
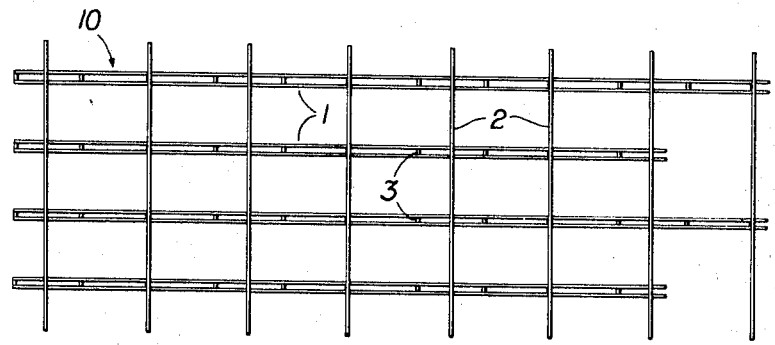
Figure 16:
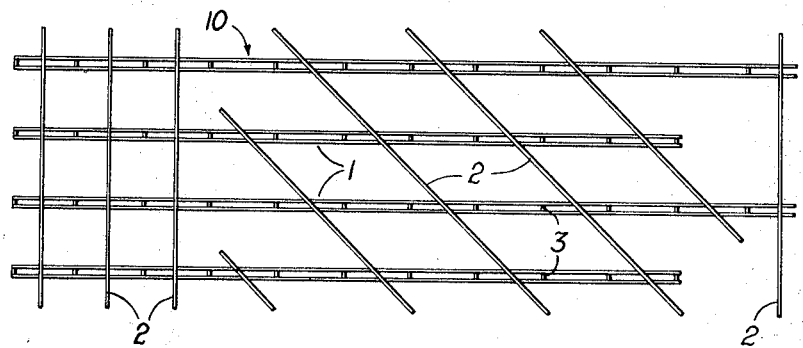
Figure 19:
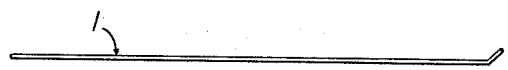

Further features and advantages of the invention will become apparent from the following description of various embodiments, In the accompanying drawing:
FIGS. 1–5 are top plan views showing different mesh reinforcements according to the invention;
FIG. 6 is a vertical sectional view taken through a reinforced-concrete structure which comprises a slab reinforced with a mesh reinforcement according to the invention;
FIGS. 7 and 8 are, respectively, a top plan view and a side elevation showing the end portion of a mesh reinforcement with double bars, each of which is twisted about its longitudinal axis;
FIG. 9 is a vertical sectional view showing a structure consisting of prefabricated parts and the mesh reinforcement of FIGS. 7 and 8;
FIG. 10 is a perspective view showing an angle-shaped mesh reinforcement;
FIG. 11 is a top plan view showing a different mesh reinforcement;
FIGS. 12 and 13 are side elevations showing two further embodiments;
FIG. 14 is a perspective view showing an angle-shaped mesh reinforcement;
FIG. 15 is a top plan view showing a mesh reinforcement having double bars of different lengths;
FIG. 16 shows a reinforcement assembly which consists of two mesh reinforcements of the type shown in FIG. 15;
FIGS. 17 and 18 are similar views showing a modification;
FIG. 19 shows a mesh reinforcement having double bars with bent-up ends; and
FIG. 20 shows the incorporation of the reinforcement of FIG. 19 in a floor structure.

In the mesh reinforcement shown in FIG. 1, conventional Bistahl (ladderlike) bars 1 are spaced apart and connected by welded transverse distributors 2. The transverse bars 2 register with cross-webs 3 of the longitudinal bars 1, at least one and preferably two cross-webs 3, as shown in FIG. 1, being disposed between adjacent crossings of double bars 1 and transverse bars 2; the bars 1 of each pair are interconnected at each end by one such cross-web 3. Bistahl (ladderlike) bars may be replaced by double bars which are interconnected by cross-webs of metal, plastic material or the like in any desired manner. The mesh reinforcement may be cut apart parallel to the transverse bars 2 when required. In this case, the remaining cross-webs 3 of the double bars on both sides of the cut are available for the terminal connection.

Figures 2, 3:
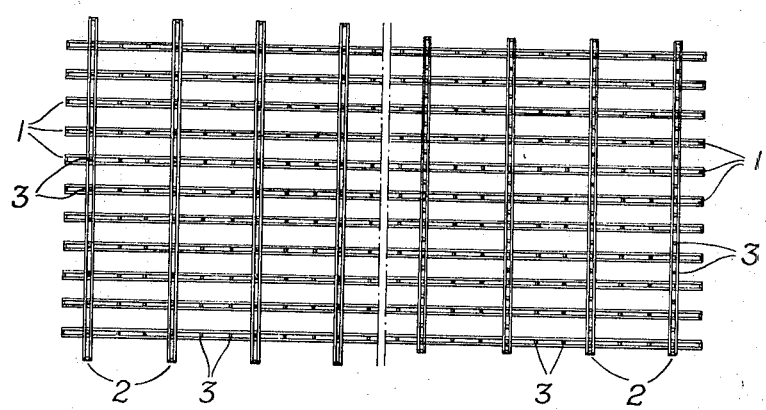

According to FIGS. 2 and 3, the transverse distributors 2 consist also of Bistahl (ladderlike) bars. According to FIG. 2, all cross-webs 3 of bars 2 are disposed at the location of respective cross webs 3 of bars 1. According to FIG. 3, the longitudinal bars 1 register only with alternate cross-webs 3 of the transverse distributors 2.

Figure 4:
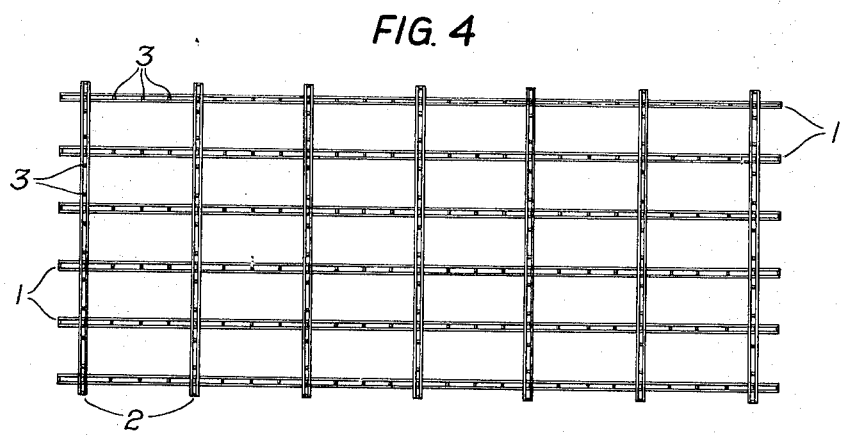

In the embodiment shown in FIG. 4, the distances between the longitudinal bars 1 are larger and the transverse distributors 2 consist again of Bistahl (ladderlike) bars. In this case, two cross-webs are provided between adjacent intersections in the transverse distributor 2 and more than two cross-webs, e.g., three cross-webs, are disposed between adjacent intersections in the longitudinal bar 1. Again, the mesh reinforcement may be cut transversely and parallel to the longitudinal bars 1 and the cross-web at the end will always be available for the terminal connection.

Alternatively, the transverse distributors 2 may be disposed at an oblique angle to the longitudinal bars 1. According to FIG. 5, this angle may be 45°. In this case, the crossings lie suitably between the cross-webs 3. A transverse distributor 2' is advantageously provided at each end of bars 1 and extends at right angles thereto.

The bars 1, 2 may be welded together at each intersection or only at isolated intersections.

As is apparent from FIG. 6, the mesh reinforcement according to the invention can easily and safely be connected to various parts of a reinforced-concrete structure.

When the mesh reinforcement according to the invention as shown in FIGS. 1–5 is used in structures made from prefabricated parts, the end portions of each Bistahl bar 1 are suitably twisted by 90° about its longitudinal axis, as is shown in FIGS. 7 and 8. FIG. 9 shows a joint made in a structure which comprises a prefabricated wall element 4, prefabricated floor elements 5 and mesh reinforcements thus designed in accordance with the invention. Between the double bars 1, a transverse bar 6 is inserted behind the cross-web 3 into the space 7 which lies between the end faces of the floor elements 5 and is to be grouted.

For a reinforcement of rodlike elements, such as beams, columns and the like, as well as their joints, the mesh reinforcements shown in FIGS. 1–5 may be angle-shaped, as is shown in FIG. 10; see also my copending application Ser. No. 660,001 filed Aug. 11, 1967.

A modification of the previously described flat or angular mesh reinforcements consists of a bar 1 which has been bent to form a closed loop and has ends 3 joined by welding or by other means, as is apparent in FIG. 11.

The modifications described with reference to FIGS. 1 to 10 may also be adopted in this embodiment so that there is a large freedom of design within the scope of the invention.

FIGS. 12 and 13 are elevations showing an embodiment in which the Bistahl (ladderlike) double bars 1 are disposed in a plane which is normal rather than parallel to the plane of the transverse distributors 2. The transverse distributors 2 may be simple bars, as shown in FIG. 12, or double bars connected by cross-webs 3, as shown in FIG. 13. These embodiments of the mesh reinforcements may also be angle-shaped. For instance, FIG. 14 is a side elevation showing a reinforcement assembly which is composed of mesh reinforcements according to FIG. 12 and which is particularly suitable for columns.

Further applications of the mesh reinforcement according to the invention are made possible by making such reinforcements of different lengths in a modular system. In this case, the mesh reinforcement consists of two separate reinforcement sections, which may be identical or different, each shorter than the span of the slab. These mesh reinforcements can be superimposed from opposite ends of the span to provide a staggered reinforcement assembly meeting the statical requirements.

FIG. 15 shows a mesh-reinforcement section 10 having double bars 1 of different lengths at its right-hand end. The assembly formed by superimposing two such reinforcement sections 10, 10' from opposite ends of the span is shown in FIG. 17 and constitutes a staggered flat reinforcement. The lengths of the mesh-reinforcement sections and their overlap may be selected to meet the respective load requirements. A cutting of the mesh reinforcements to size is not required in such case. Besides, the two mesh-reinforcement sections may be relatively staggered in vernier fashion to cover any desired span within a certain range, which corresponds to one size increment of the modular system. When the maximum or minimum span of this range has been reached, the next-larger or next smaller size of the modular system may be adopted.

Figure 5:
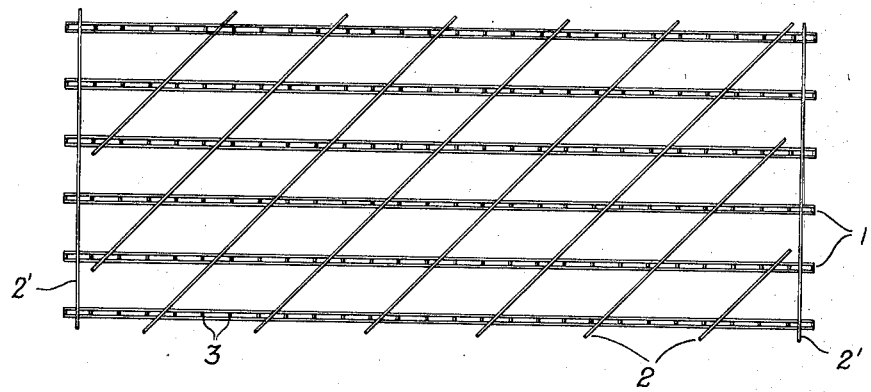

The embodiments shown in FIGS. 16 and 18 differ from those of FIGS. 15 and 17 in that the transverse distributors extend an an angle of 45° to the double bars 1, as in the embodiment of FIG. 5. In the middle area, where the mesh-reinforcement sections 10, 10' overlap, the oblique distributors 2 form a network of bars crossing in four directions, as is shown in FIG. 18.

Alternatively, the end portions of the double bars may be bent up at about 45°, as is shown in FIG. 19, where the transverse distributors have been omitted. This design enables a desirable configuration of the longitudinal reinforcement in a zone where large transverse forces occur, e.g., in a floor structure as shown in FIG. 20.

Further modifications of the embodiments which have been described are possible within the scope of the invention.

What is claimed is:

1. A reinforced-concrete structure comprising a concrete body with a planar array of longitudinal reinforcing members and transverse stress-distributing members imbedded therein, said longitudinal members consisting each of a pair of closely spaced parallel bars with major portions lying in the plane of the array and a multiplicity of cross-bars interconnecting said parallel bars, said transverse members contactingly intersecting said longitudinal members and being welded to said parallel bars thereof along said major portions, said longitudinal members being provided with twisted portions in which said parallel bars thereof lie in planes transverse to the plane of the array; and a transverse bar extending parallel to said transverse members while passing between the bars of said longitudinal members at said twisted portions thereof.

2. A structure as defined in claim 1, further comprising a second planar array substantially identical with and parallel to the first-mentioned array imbedded in said body 3. A structure as defined in claim 1 wherein said twisted portions are formed by interconnected extremities of endwise adjoining longitudinal members.

4. A structure as defined in claim 3 wherein said concrete body comprises a pair of adjacent slabs respectively containing said endwise adjoining members, said slabs being interconnected by grouting enveloping said transverse bar.

5. A structure as defined in claim 1 wherein said twisted portion includes cross-bars perpendicular to the plane of the array.

6. A structure as defined in claim 5 wherein said transverse bar is bracketed by two of said perpendicular cross-bars.

References Cited

UNITED STATES PATENTS

| 766,280 | 8/1904 | O'Shea | 52—736 |
| 830,494 | 9/1906 | Collins | 52—735 |
| 1,046,913 | 12/1912 | Weakley | 52—736 |

FOREIGN PATENTS

| 298,221 | 6/1900 | France. | |

FRANK L. ABBOTT, Primary Examiner

J. L. RIDGILL, Jr., Assistant Examiner

U.S. Cl. X.R.

52—664, 735, 648, 251